United States Patent

Muse et al.

[15] 3,639,980
[45] Feb. 8, 1972

[54] PIPE CUTTER

[72] Inventors: George H. Muse; Peter J. Keane, both of Erie, Pa.

[73] Assignee: Erie Tool Works, Erie, Pa.

[22] Filed: Feb. 3, 1969

[21] Appl. No.: 795,878

[52] U.S. Cl. ................................................30/102, 308/18
[51] Int. Cl. .........................................................B23d 21/08
[58] Field of Search ..............................30/102, 101; 308/18

[56] References Cited

UNITED STATES PATENTS

| | | | |
|---|---|---|---|
| 1,977,441 | 10/1934 | Kenerson | 30/102 |
| 2,666,984 | 1/1954 | Shafer | 30/102 |
| 2,824,772 | 2/1958 | Petersen | 30/101 X |
| 2,827,339 | 3/1958 | Zunich | 308/18 |

Primary Examiner—Andrew R. Juhasz
Assistant Examiner—Michael Koczo, Jr.
Attorney—Charles L. Lovercheck

[57] ABSTRACT

The pipe cutter disclosed herein is made up of a frame having a slide. The frame has a cutting wheel rotatably supported on it and two spaced noncutting wheels supported on the slide. Instead of the two noncutting wheels and one cutting wheel, three cutting wheels may be used or two noncutting wheels and a cutting means of some other form, or any combination of cutting or noncutting wheels. Also, some known cutting means could be used in combination with the noncutting wheels within the scope of the invention. A threaded means is provided to move the slide toward the cutting wheels. The cutting wheels are supported on pins and the pins each have a peripheral groove which receives an O-ring or a C-washer. The O-ring or C-washer is received in a space on the inner face of the guide blocks which receive the pin. The pin is thus held in position in the support by the O-ring or C-washer.

1 Claims, 9 Drawing Figures

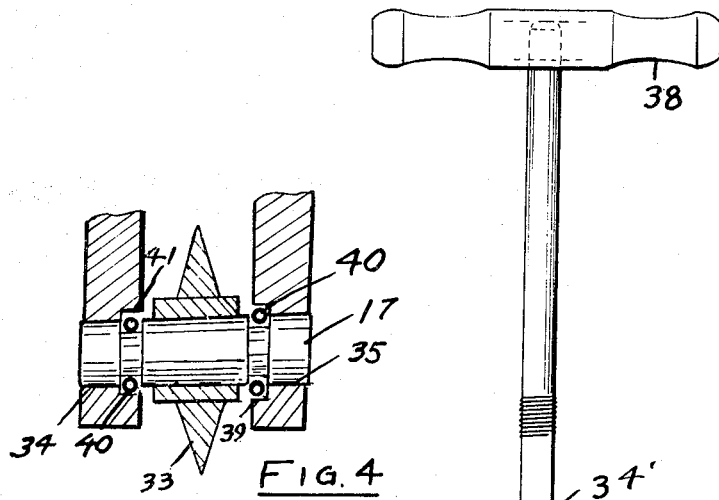
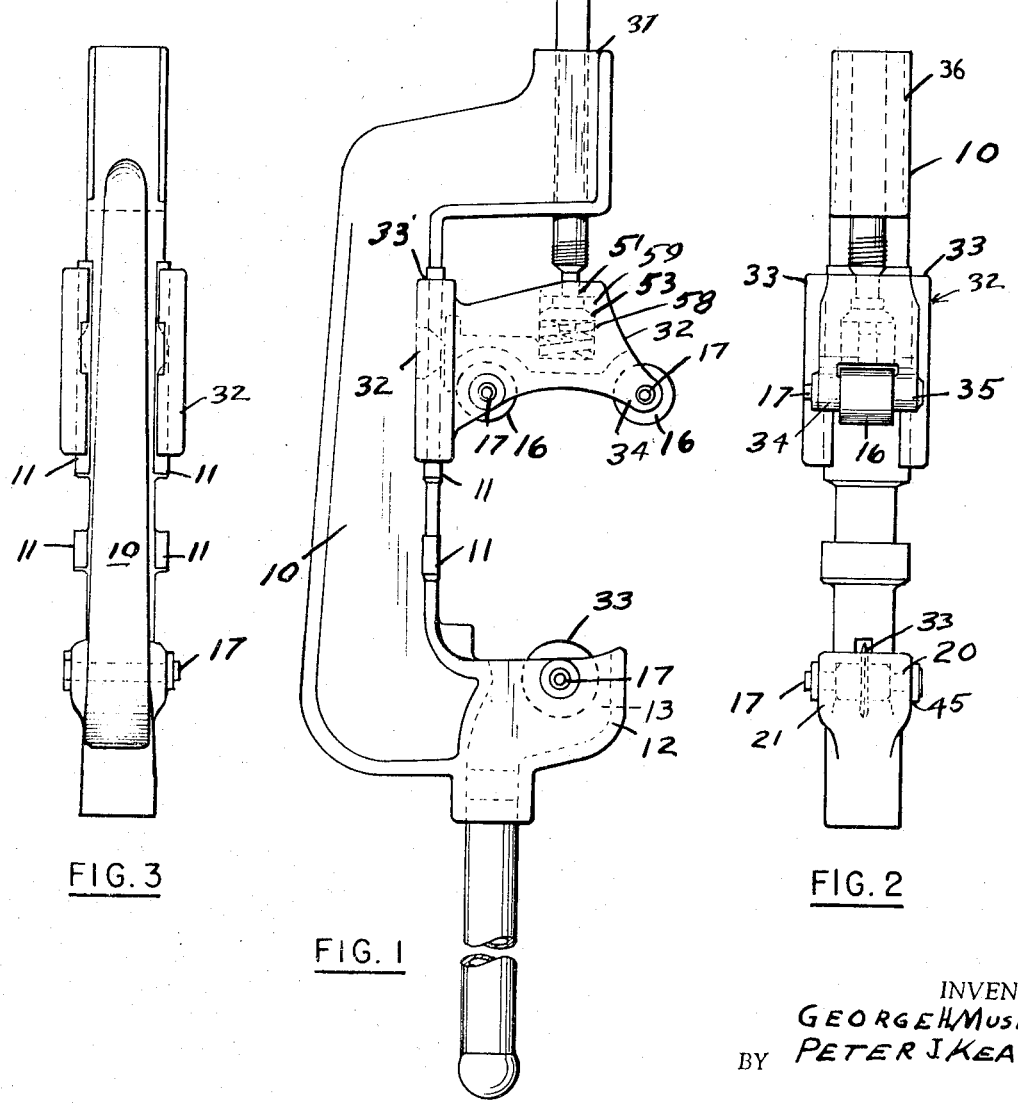

3,639,980

PIPE CUTTER

FIELD OF INVENTION

This invention relates to cutters and, more particularly, to tubing cutters.

DESCRIPTION OF PRIOR ART

This invention is an improvement on the tubing cutter disclosed in U.S. Pat. No. 2,824,772.

OBJECTS OF THE INVENTION

It is, accordingly, an object of the invention to provide an improved pipe cutter.

Another object of the invention is to provide a pipe cutter that is simple in construction, economical to manufacture, and simple and efficient to use.

Another object of the invention is to provide an improved pin and wheel holder in a pipe cutter.

BRIEF DESCRIPTION OF DRAWINGS

FIG. 1 is a side view of a pipe cutter according to the invention;

FIG. 2 is a front view of the pipe cutter shown in FIG. 1;

FIG. 3 is a rear view of the pipe cutter; and

FIG. 4 is an enlarged cross-sectional view of a part of the pipe cutter showing the support and fastening means;

DESCRIPTION OF PREFERRED EMBODIMENT

Figure 7:
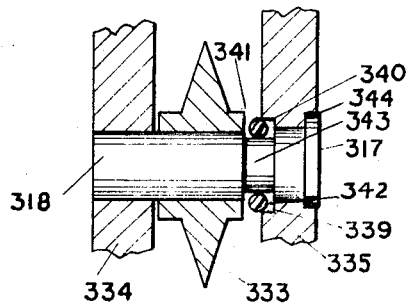
FIGS. 5, 6, 7, 8 and 9 are cross-sectional views similar to FIG. 4 showing other embodiments of the invention.

Now with more particular reference to the drawings, the pipe cutter has a generally C-shaped frame 10 that has laterally extending integral flanges 11 extending laterally from each side of the frame. The lower part of the frame 12 has a recess 13 in it that provides two spaced supports 20 and 21 for the lower pin 17. The upper pins 17 are supported between spaced supports 34 and 35 on the slide 32. The slide 32 has the slotted guide blocks 33' at each side and the slots in these guide blocks receive the laterally extending flanges 11 and guide the slide 32 up and down. The threaded rod 34' is threadably received in the internal threads 36 in the upper end 37 of the C-shaped frame. By rotating the handle 38, the slide 32 may be moved up and down.

The noncutting wheels 16 are supported on pins 17 in the supports 34 and the pins each have a circumferential groove 39 with a C-shaped spring washer 40 in it. This spring washer 40 is received in the space 41 in the support 34 and a similar arrangement is formed in the supports 20 and 21. The word "space" is used herein to cover countersinks as well as other enlarged parts of a hole. These C-shaped washers could be disposed on each side of the wheel 33 or there could be a head 45 on one end of each pin and the C-shaped washer could be disposed at the opposite side of the support on the same side of the wheel. As used herein, the word "wheel" is intended to be broad enough to cover a pipe-engaging roller as well as any one or all of noncutting wheels 16 and a cutting wheel 33.

The spring 58 is supported in a space 59 in the slide 32 and the member 53 rests against the ends of this helical compression spring. Thus a certain amount of resilience is introduced between the spring and the slide.

Figure 5:
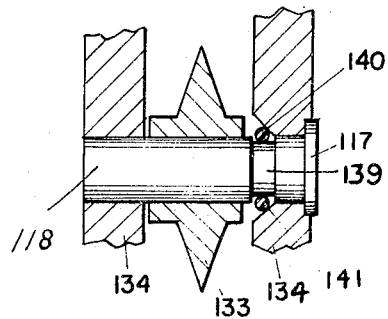

In the embodiment of the invention shown in FIG. 5, a partial cross-sectional view of another embodiment of the invention is shown. Two spaced supports 134 are shown which are supported on a slide similar to the slide 32 in FIGS. 1 and 2.

The wheel 133 is shown supported on the pin 118 in the supports 134. The pin 118 has a circumferential groove 139 with a C-shaped spring washer 140 in it. This spring washer 140 is received in the space 141 in the support 134. The pin 118 has a head 117. Since the spring washer is on the opposite side of the support 134 from the head 117, the pin is held in place between the supports 134. The radial thickness of the C-shaped spring washer 140 is greater than the depth of the groove 139 in a direction from the outer surface of the frame inwardly therefrom so that the washer 140 prevents the pin from coming out of the supports.

Figure 6:
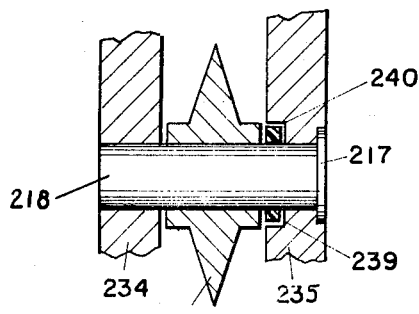

In the embodiment of the invention shown in FIG. 6, the supports 234 and 235 are similar to the corresponding supports in the embodiment of the invention shown in FIGS. 1 and 2. The supports have holes bored in them that receive the pin 218. The pin 218 has a head 217 that is received in the space in the outer left side of the support 235. The pin extends through the holes in the supports 234 and 235 and through the bore in the wheel 233. A resilient washer 240 is received in the space 239 and it frictionally grips the outer periphery of the pin and prevents it from sliding.

In the embodiment of the invention shown in FIG. 7, we show two supports 334 and 335 that each have a hole in them through which the pin 318 extends. The pin 318 has a head 317 that is disposed in a space 344. The pin has a peripheral groove 343 in which the O-ring 342 is disposed. The O-ring is partly located in the space 340. The O-ring has a thickness in a radial direction slightly greater than the depth of the groove 343 in a direction toward the center of the pin and is disposed in the space between the hub 341 of the wheel 333 and the bottom 339 of the space. Thus, the O-ring prevents the pin from being withdrawn from the holes in the supports.

Figure 8:
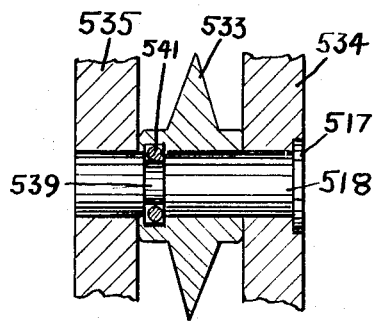

In the embodiment of the invention shown in FIG. 8, the supports 534 and 535 are similar to the supports shown in the other embodiments of the invention. The ring 541 is disposed in a counterbore in the wheel 533 and it is slightly greater in radial thickness than the depth of the groove 539 in the pin 518. The head 517 locates the pin in the support 534 and 535. The ring 514 is slightly greater in depth than the groove 539 and, therefore, it extends up into the counterbore in the wheel 533 and prevents it from sliding. The ring also prevents the pin from sliding laterally out of the support since it engages the bottom of the counterbore thereby preventing lateral sliding.

Figure 9:
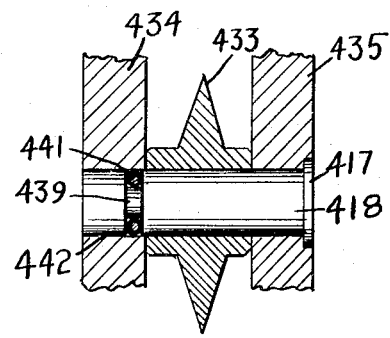

In the embodiment of the invention shown in FIG. 9, spaced supports 434 and 435 are shown that are bored to receive the pin 418. The pin 418 has a peripheral groove 439 which receives a resilient O-shaped washer 441. This washer is slightly greater in radial thickness than the depth of the groove 439 so that it frictionally engages inside of the bore 442 in the support.

In each of the embodiments of the invention shown, it will be clear to those skilled in the art that C-washers can be used interchangeably with O-rings and circular washers; and in the embodiment of the invention shown in FIG. 6, for example, the washer may be made of a flexible resilient material.

What is claimed is:

1. A pipe cutter having a frame,
   and two spaced frame members,
   means on said frame to support and cut a pipe to be cut,
   said means to support and cut said pipe comprising a pin,
   a wheel on said pin,
   an opening in said support rotatably receiving an end of said pin,
   retaining means to retain said pin against axial movement relative to said frame,
   said retaining means comprising a groove in said pin and a space in one said frame member on the side adjacent said wheel,
   a ring on said pin received in said space,
   said ring having a thickness in a radial direction substantially equal to the depth of said space in said radial direction,
   and means to prevent said ring and said pin from sliding relative to each other.

* * * * *